(12) United States Patent
Goto et al.

(10) Patent No.: US 12,355,508 B2
(45) Date of Patent: Jul. 8, 2025

(54) WIRELESS COMMUNICATION SYSTEM, RELAY DEVICE, COMMUNICATION DEVICE, AND WIRELESS COMMUNICATION METHOD

(71) Applicant: NIPPON TELEGRAPH AND TELEPHONE CORPORATION, Tokyo (JP)

(72) Inventors: Daisuke Goto, Musashino (JP); Kiyohiko Itokawa, Musashino (JP); Yasuyoshi Kojima, Musashino (JP); Fumihiro Yamashita, Musashino (JP); Yosuke Fujino, Musashino (JP); Kento Yoshizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 318 days.

(21) Appl. No.: 18/007,631

(22) PCT Filed: Jun. 5, 2020

(86) PCT No.: PCT/JP2020/022254
§ 371 (c)(1),
(2) Date: Dec. 1, 2022

(87) PCT Pub. No.: WO2021/245908
PCT Pub. Date: Dec. 9, 2021

(65) Prior Publication Data
US 2023/0231596 A1 Jul. 20, 2023

(51) Int. Cl.
*H04B 7/01* (2006.01)
*H04B 7/195* (2006.01)
*H04B 10/118* (2013.01)

(52) U.S. Cl.
CPC ............ *H04B 7/01* (2013.01); *H04B 7/195* (2013.01)

(58) Field of Classification Search
CPC . H04B 7/01; H04B 7/195; H04B 7/14; H04B 7/18536; H04B 7/185; H04B 7/18508; H04B 7/1851; H04B 10/118
See application file for complete search history.

(56) References Cited

U.S. PATENT DOCUMENTS 10,554,293 B1 * 2/2020 Chin ................... H04W 74/006
2017/0347340 A1 * 11/2017 Haley ............... H04L 25/03343
(Continued)

FOREIGN PATENT DOCUMENTS

CA 3087618 A1 7/2019
EP 0728385 B1 5/2006
(Continued)

OTHER PUBLICATIONS

R. Fantacci et al., "Multiuser Interference Cancellation Receivers for OFDMA Uplink Communications with Carrier Frequency Offset", IEEE Global Telecommunications Conference, 2004. GLOBECOM'04. vol. 5. IEEE,2004.

*Primary Examiner* — Kent Krueger
(74) *Attorney, Agent, or Firm* — Harness, Dickey & Pierce, P.L.C.

(57) ABSTRACT

A first offset compensator configured to compensate for frequency offsets occurring during communications between a plurality of communication devices and a relay device, wherein when the first offset compensator is provided on the relay device, the first offset compensator gives a statistical frequency offset obtained from a statistic of a plurality of frequency offsets occurring during communications between respective ones of the plurality of communication devices and the relay device to a receiver configured to receive wireless signals transmitted from respective ones of the (Continued)

plurality of communication devices, and when the first offset compensator is provided on each of the plurality of communication devices, the first offset compensator gives a frequency offset occurring during communications between the communication device provided with the first offset compensator and the relay device to a transmitter configured to transmit wireless signals to the relay device.

4 Claims, 7 Drawing Sheets

(56) References Cited

U.S. PATENT DOCUMENTS

| | | | |
|---|---|---|---|
| 2020/0196263 A1* | 6/2020 | Heyn | H04W 56/0005 |
| 2021/0409141 A1* | 12/2021 | Takemoto | H04B 7/18508 |

FOREIGN PATENT DOCUMENTS

| | | |
|---|---|---|
| JP | 2013153271 A | 8/2013 |
| JP | 2018-506876 A | 3/2018 |
| WO | WO-2016/090411 A1 | 6/2016 |
| WO | WO-2019/097855 A1 | 5/2019 |

* cited by examiner

WIRELESS COMMUNICATION SYSTEM, RELAY DEVICE, COMMUNICATION DEVICE, AND WIRELESS COMMUNICATION METHOD

CROSS-REFERENCE TO RELATED APPLICATIONS

This application is a 371 U.S. National Phase of International Application No. PCT/JP2020/022254, filed on Jun. 5, 2020. The entire disclosure of the above application is incorporated herein by reference.

TECHNICAL FIELD

The present invention relates to a wireless communication system, a relay device, a communication device, and a wireless communication method.

BACKGROUND ART

With the development of IoT (Internet of Things) technology, installation of IoT terminals equipped with various sensors in various locations is being considered. For example, IoT terminals are expected to be utilized to collect data in places, such as on buoys or ships on the ocean or in mountainous regions, where base stations are difficult to install.

Besides, a technique for wirelessly communicating between IoT terminals and UAVs (Unmanned Aerial Vehicles) or geostationary satellites has also been proposed.

When a moving body such as a UAV or a geostationary satellite moves, communications conducted between the moving body and a communication device, such as an IoT terminal or a base station, installed on earth are impacted by Doppler shift. Conventionally, a technique has been proposed to reduce the impact of the Doppler shift by causing a communication device on the receiving side to compensate for frequency offsets of uplink signals (see, for example, Non-patent Literature 1).

CITATION LIST

Non-Patent Literature

Non-Patent Literature 1: R. Fantacci, D. Marabissi, S. Papini, "Multiuser Interference Cancellation Receivers for OFDMA Uplink Communications with Carrier Frequency Offset", IEEE Global Telecommunications Conference, 2004. GLOBECOM'04. Vol. 5. IEEE, 2004.

SUMMARY OF THE INVENTION

Technical Problem

With the technique described in Non-patent Literature 1, the communication device on the receiving side compensates for frequency offsets of uplink signals transmitted from respective ones of plural terminal devices. That is, the technique described in Non-patent Literature 1 compensates for frequency offsets so as to reduce the frequency offset for each terminal device. Application of this technique to communications conducted between communication devices installed on earth and a moving body is effective when the number of communication devices that transmit uplink signals to the moving body is small. However, there is a problem in that amounts of computation of the moving body receiving the uplink signals increase with increases in the number of communication devices transmitting the uplink signals to the moving body.

In view of the above circumstances, an object of the present invention is to provide a technique capable of reducing an impact of Doppler shift while suppressing amounts of computation.

Means for Solving the Problem

According to one aspect of the present invention, there is provided a wireless communication system that includes a plurality of communication devices and a relay device, which is mobile, the wireless communication system comprising a first offset compensation unit adapted to compensate for frequency offsets occurring during communications between the plurality of communication devices and the relay device, wherein when the first offset compensation unit is provided on the relay device, the first offset compensation unit gives a statistical frequency offset obtained from a statistic of a plurality of frequency offsets occurring during communications between respective ones of the plurality of communication devices and the relay device to a reception unit adapted to receive wireless signals transmitted from respective ones of the plurality of communication devices, and when the first offset compensation unit is provided on each of the plurality of communication devices, the first offset compensation unit gives a frequency offset occurring during communications between the communication device provided with the first offset compensation unit and the relay device to a transmission unit adapted to transmit wireless signals to the relay device.

According to another aspect of the present invention, there is provided a relay device in a wireless communication system that includes a plurality of communication devices and the relay device, which is mobile, the relay device comprising: a reception unit adapted to receive wireless signals transmitted from respective ones of the plurality of communication devices; and a first offset compensation unit adapted to compensate for frequency offsets occurring during communications between the plurality of communication devices and the relay device, wherein the first offset compensation unit gives a statistical frequency offset obtained from a statistic of a plurality of frequency offsets occurring during communications between respective ones of the plurality of communication devices and the relay device to the reception unit.

According to another aspect of the present invention, there is provided a communication device in a wireless communication system that includes a plurality of communication devices and a relay device, which is mobile, the communication device comprising: a transmission unit adapted to transmit wireless signals to the relay device; and a first offset compensation unit adapted to compensate for frequency offsets occurring during communications between the plurality of communication devices and the relay device, wherein the first offset compensation unit gives a frequency offset occurring during communications between the communication device and the relay device to the transmission unit.

According to another aspect of the present invention, there is provided a wireless communication method for a wireless communication system that includes a plurality of communication devices and a relay device, which is mobile, the wireless communication method comprising an offset compensation step whereby the plurality of communication devices or the relay device compensates for frequency offsets occurring during communications between the plurality of communication devices and the relay device, wherein when the relay device has the offset compensation step, the offset compensation step gives a statistical frequency offset obtained from a statistic of a plurality of frequency offsets occurring during communications between respective ones of the plurality of communication devices and the relay device to a reception unit adapted to receive wireless signals transmitted from respective ones of the plurality of communication devices, and when each of the plurality of communication devices has the offset compensation step, the offset compensation step gives frequency offsets occurring during communications between the communication devices having the offset compensation step and the relay device to a transmission unit adapted to transmit wireless signals to the relay device.

Effects of the Invention

The present invention makes it possible to reduce effects of Doppler shift while suppressing amounts of computation.

DESCRIPTION OF EMBODIMENTS

Embodiments of the present invention will be described in detail below with reference to the accompanying drawings.

First Embodiment

Figure 1:
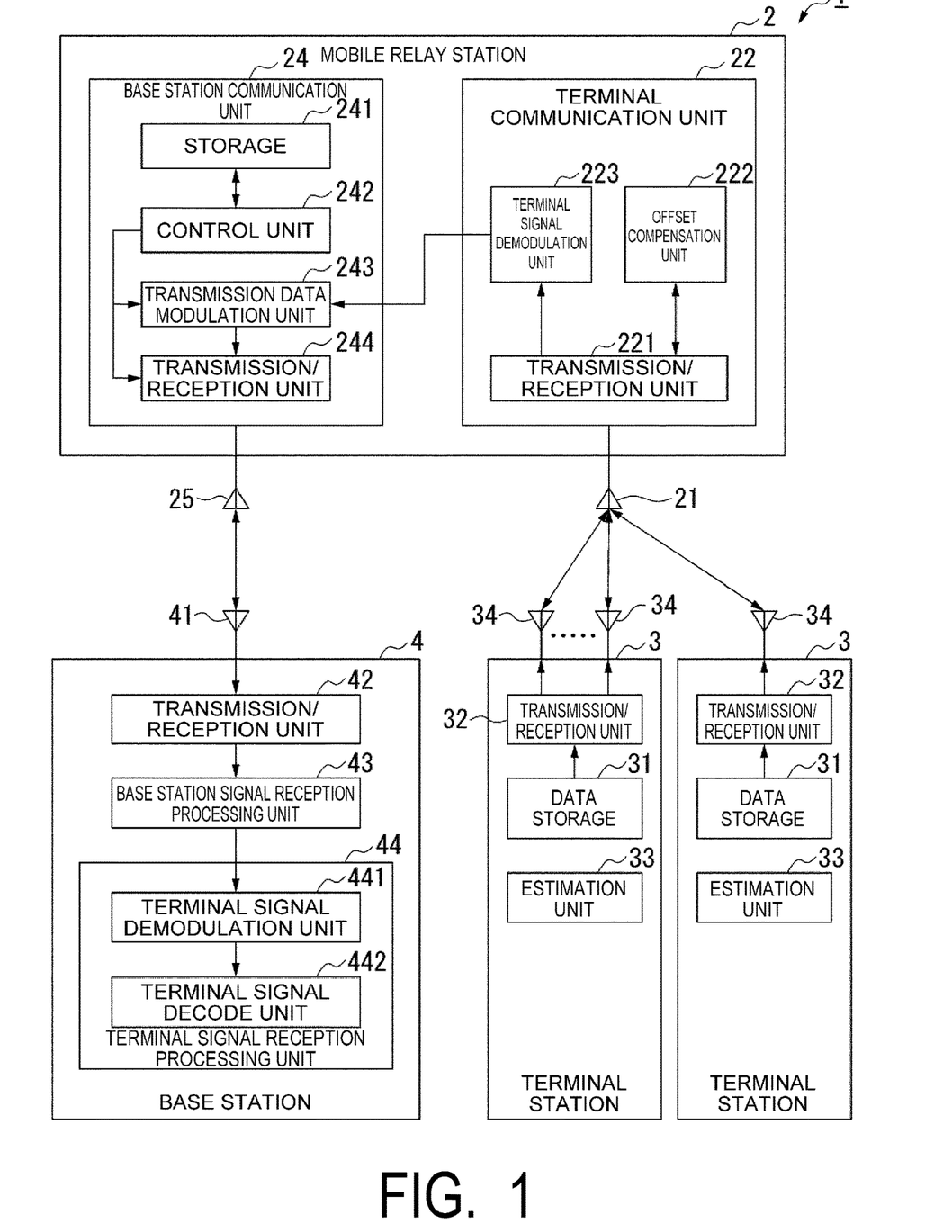
FIG. 1 is a configuration diagram of a wireless communication system according to a first embodiment.

FIG. 1 is a configuration diagram of a wireless communication system 1 according to a first embodiment. The wireless communication system 1 includes a mobile relay station 2, plural terminal stations 3, and a base station 4. The number of each of the mobile relay stations 2, the terminal stations 3, and the base stations 4 included in the wireless communication system 1 is arbitrary It is assumed that there are a large number of terminal stations 3.

The mobile relay station 2 is an example of a relay device mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. While moving over the Earth, the mobile relay station 2 receives data transmitted from the terminal station 3, as a wireless signal. The mobile relay station 2 transmits the received data to the base station 4 by wireless.

The terminal station 3 collects data such as environmental data detected by a sensor and wirelessly transmits the data to the mobile relay station 2. The terminal station 3 is, for example, an IoT terminal. Only two terminal stations 3 are shown in FIG. 1. Hereinafter signals transmitted from the terminal stations 3 to the mobile relay station 2 will be referred to as terminal uplink signals.

The base station 4 receives the data collected by the terminal station 3 from the mobile relay station 2.

The terminal stations 3 and the base station 4 are installed at specific positions on earth such as on the ground or on the ocean.

It is conceivable to use a relay device mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow.

Furthermore, drones require batteries and HAPS require solar panels. In the present embodiment, the mobile relay station 2 is mounted on a LEO satellite. Therefore, in addition to keeping the link budget within a limit, the LEO satellite has no air resistance and consumes less fuel because it orbits outside the atmosphere. In addition, the footprint is also large as compared to the case where a relay station is mounted on a drone or a HAPS.

The mobile relay station 2 mounted on the LEO satellite performs communication while moving at a high speed. Consequently, signals exchanged between the mobile relay station 2 and the terminal stations 3 undergo Doppler shift. For example, the frequency of a terminal uplink signal received by the mobile relay station 2 shifts from the frequency existing at the time of transmission from the terminal station 3, in a predetermined range. The larger the impact of Doppler shift, the larger the frequency shift. Similarly, signals (hereinafter referred to as "downlink signals") transmitted from the mobile relay station 2 to the terminal stations 3 and the base station 4 also undergo Doppler shift.

If Doppler shift has a large impact, communications conducted between the mobile relay station 2 and the terminal stations 3 as well as communications conducted between the mobile relay station 2 and the base station 4 will be impacted. For example, if the frequency of a terminal uplink signal shifts greatly due to Doppler shift, it is likely that the mobile relay station 2 will no longer be able to receive the terminal uplink signal. For example, it is likely that the terminal stations 3 and the base station 4 will no longer be able to receive the downlink signal transmitted from the mobile relay station 2.

Thus, the mobile relay station 2 according to the first embodiment performs control to reduce the impact of Doppler shift on the communications conducted between the mobile relay station 2 and the terminal stations 3. Specifically, the mobile relay station 2 according to the first embodiment calculates statistical values of plural frequency offsets occurring during communications between respective ones of the plural terminal stations 3 and the mobile relay station 2. Then, the mobile relay station 2 changes a receivable frequency band based on the calculated statistical values of the plural frequency offsets.

Configurations of individual devices will be described.

The mobile relay station 2 includes an antenna 21, a terminal communication unit 22, a base station communication unit 24, and an antenna 25.

The terminal communication unit 22 includes a transmission/reception unit 221 (receiver), an offset compensation unit 222 (first offset compensation unit) (first offset compensator), and a terminal signal demodulation unit 223.

The transmission/reception unit 221 conducts communications with the terminal stations 3. For example, the transmission/reception unit 221 receives terminal uplink signals via the antenna 21.

The offset compensation unit 222 compensates for the frequency offsets occurring during communications between the plural terminal stations 3 and the mobile relay station 2. More specifically, the offset compensation unit 222 gives a statistical frequency offset obtained from a statistic of plural frequency offsets occurring during communications between respective ones of the plural terminal stations 3 and the mobile relay station 2 to the transmission/reception unit 221. The statistic may be, for example, a mean value or a median.

Giving a statistical frequency offset to the transmission/reception unit 221 means changing the frequency band receivable by the transmission/reception unit 221 in such a way as to eliminate the statistical frequency offset. In this way, by giving a statistical frequency offset to the transmission/reception unit 221, the mobile relay station 2 corrects for a shift corresponding to the statistical frequency offset.

The terminal signal demodulation unit 223 demodulates the terminal uplink signals received by the transmission/reception unit 221 and outputs the demodulation results as demodulation information to the base station communication unit 24.

The base station communication unit 24 transmits receive waveform information to the base station 4 using a downlink signal of a desired wireless communication scheme. The base station communication unit 24 includes a storage 241, a control unit 242, a transmission data modulation unit 243, and a transmission unit 244.

The storage 241 stores precalculated transmission start timing based on orbital information about the LEO satellite carrying the mobile relay station 2 and the position of the base station 4. The orbital information about the LEO satellite provides information about the position, velocity, moving direction, and the like of the LEO satellite at any desired time. Send time may be expressed, for example, by elapsed time with respect to the transmission start timing.

The control unit 242 controls the transmission data modulation unit 243 and the transmission unit 244 such that the receive waveform information will be transmitted to the base station 4 at the transmission start timing that is stored in the storage 241.

The transmission data modulation unit 243 reads the receive waveform information as transmit data out of a data storage unit 23, modulates the read transmit data, and thereby generates a base station downlink signal.

The transmission unit 244 converts the base station downlink signal from an electric signal into a wireless signal and transmits the resulting signal from the antenna 25.

The terminal station 3 includes a data storage 31, a transmission/reception unit 32, an estimation unit 33, and one or more antennas 34.

The data storage 31 stores sensor data and the like.

The transmission/reception unit 32 conducts communications with the mobile relay station 2. For example, the transmission/reception unit 32 reads sensor data as terminal transmit data out of the data storage 31. The transmission/reception unit 32 wirelessly transmits a terminal uplink signal containing the read terminal transmit data from the antennas 34. For example, the transmission/reception unit 32 receives the downlink signal transmitted from the mobile relay station 2 and outputs the downlink signal to the estimation unit 33.

The transmission/reception unit 32 transmits and receives signals using, for example, LPWA (Low Power Wide Area). Examples of LPWA include LoRaWAN®, Sigfox®, LTE-M (Long Term Evolution for Machines), and NB (Narrow Band)-IoT, and any desired wireless communication scheme can be used. The transmission/reception unit 32 may exchange data with other terminal stations 3 using time-division multiplexing, OFDM (Orthogonal Frequency Division Multiplexing), or the like.

By a predetermined method in the wireless communication scheme to be used, the transmission/reception unit 32 determines the channel and transmission timing to be used by the local station to transmit a terminal uplink signal. By a predetermined method in the wireless communication scheme to be used, the transmission/reception unit 32 may also form beams of signals to be transmitted from the plural antennas 34.

The estimation unit 33 estimates Doppler frequency based on a downlink signal.

The base station 4 includes an antenna 41, a reception unit 42, a base station signal reception processing unit 43, and a terminal signal reception processing unit 44. The reception unit 42 converts a terminal downlink signal received via the antenna 41 into an electric signal. The base station signal reception processing unit 43 demodulates and decodes the receive signal converted into an electric signal by the reception unit 42 and thereby obtains receive waveform information. The base station signal reception processing unit 43 outputs the receive waveform information to the terminal signal reception processing unit 44.

The terminal signal reception processing unit 44 performs a reception process for the terminal uplink signal indicated by the receive waveform information. In so doing, the terminal signal reception processing unit 44 acquires terminal transmit data by performing a reception process based on the wireless communication scheme used for transmission by the terminal station 3. The terminal signal reception processing unit 44 includes a terminal signal demodulation unit 441 and a terminal signal decode unit 442.

The terminal signal demodulation unit 441 demodulates waveform data and outputs a symbol obtained by the demodulation to the terminal signal decode unit 442. The terminal signal demodulation unit 441 may perform demodulation after compensating the signal indicated by the waveform data for the Doppler shift of the terminal uplink signal received by the antenna 21 of the mobile relay station 2. The Doppler shift that impacts the terminal uplink signal received by the antenna 21 is calculated in advance based on the position of the terminal station 3 and the orbital information about the LEO satellite carrying the mobile relay station 2. The terminal signal decode unit 442 decodes the symbol demodulated by the terminal signal demodulation unit 441 and thereby obtains the terminal transmit data transmitted from the terminal station 3.

Operation of the wireless communication system 1 will be described.

Figure 2:
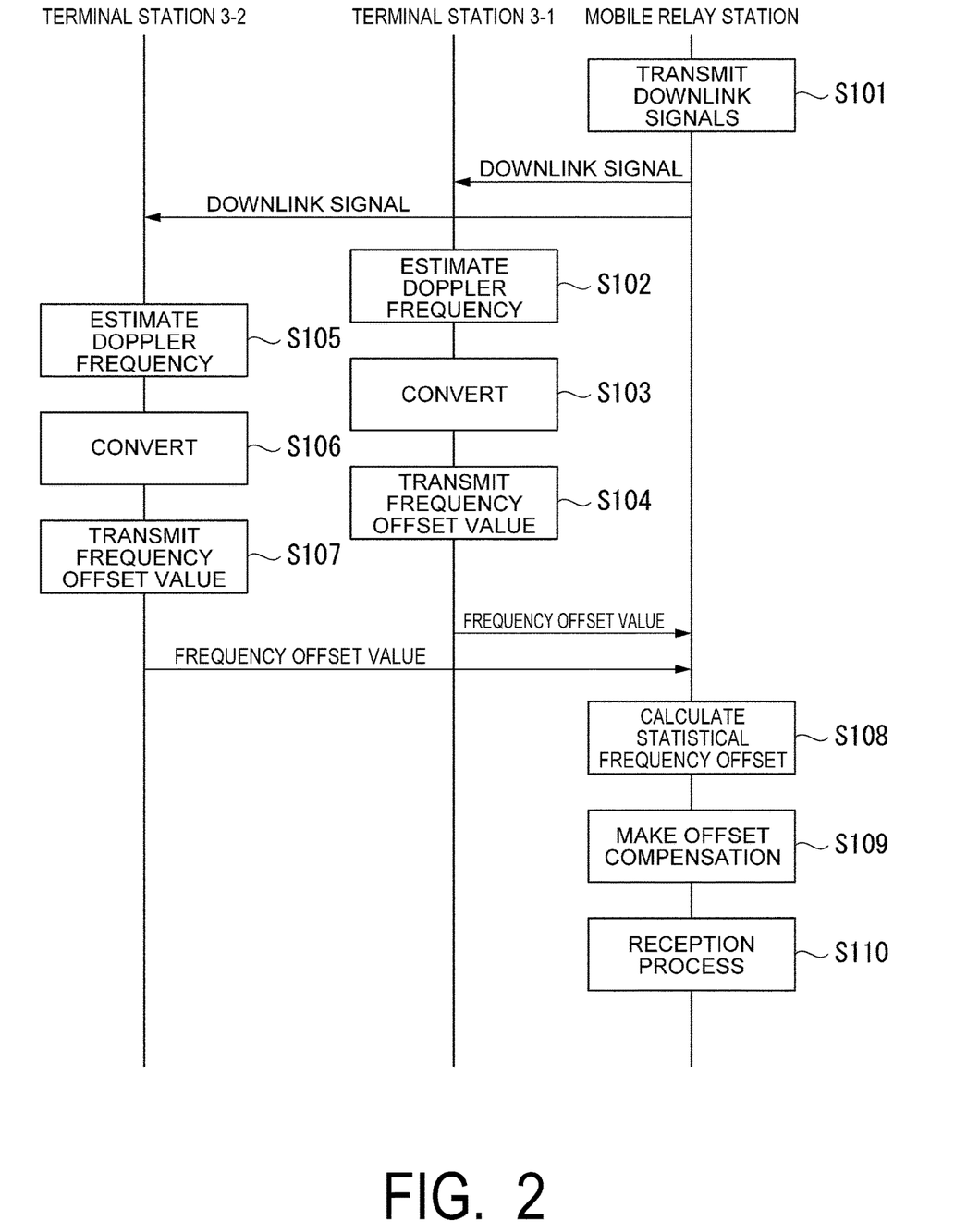
FIG. 2 is a sequence diagram showing a flow of a frequency offset process of the wireless communication system according to the first embodiment.

FIG. 2 is a sequence diagram showing a flow of a frequency offset process of the wireless communication system 1 according to the first embodiment. In FIG. 2, description will be given by taking as an example a case in which two terminal stations 3 (terminal station 3-1 and terminal station 3-2) are provided in the wireless communication system 1. To distinguish functional parts of the two terminal stations 3-1 and 3-2 from each other, branch numbers "–1" and "–2" are assigned to the respective functional parts. The process shown in FIG. 2 is performed either periodically or when a predetermined timing elapses. The predetermined timing may coincide with a preset time or with when the mobile relay station 2 has just moved a preset distance.

The mobile relay station 2 transmits downlink signals to the terminal stations 3-1 and 3-2 via the transmission/reception unit 221 (step S101).

The terminal stations 3-1 and 3-2 receive the downlink signals transmitted from the mobile relay station 2 via respective antennas 34-1 and 34-2. The received downlink signals are inputted to estimation units 33-1 and 33-2.

The estimation unit 33-1 of the terminal station 3-1 estimates Doppler frequency based on the inputted downlink signal (step S102). Regarding the Doppler frequency, specifically, the estimation unit 33-1 estimates the Doppler frequency using the inputted downlink signal, based on expression (1) below.

[Math. 1]

$$\Delta f = f \times \left(\frac{c \pm v}{c}\right) - f \qquad (1)$$
$$= \pm f \times \frac{v}{c}$$
$$= \pm f \times \frac{dx/dt}{c}$$

In expression (1), x denotes a propagated distance between the mobile relay station 2 and the terminal stations 3, t denotes elapsed time, f denotes the center frequency of the downlink signal, c denotes the velocity of light, and v denotes the travel velocity of the mobile relay station 2. The travel velocity v of the mobile relay station 2 is the change in the propagated distance per unit time and can be found, for example, from the orbital information about the mobile relay station 2. For example, the travel velocity v can be found using $(x_2-x_1)/(t_2-t_1)$.

The estimation unit 33-1 converts the estimated Doppler frequency into Doppler frequency experienced by uplink frequency (step S103). The estimation unit 33-1 transmits a frequency offset value, as the Doppler frequency resulting from the conversion, to the mobile relay station 2 via a transmission/reception unit 32-1 (step S104).

The estimation unit 33-2 of the terminal station 3-2 estimates Doppler frequency based on the inputted downlink signal (step S105). The estimation unit 33-2 converts the estimated Doppler frequency into Doppler frequency experienced by uplink frequency (step S106). The estimation unit 33-2 transmits the frequency offset value resulting from the conversion, to the mobile relay station 2 via a transmission/reception unit 32-2 (step S107).

The mobile relay station 2 receives the post-conversion frequency offset values transmitted from the terminal stations 3-1 and 3-2, via the antenna 21. The received post-conversion frequency offset values are inputted to the offset compensation unit 222. The offset compensation unit 222 performs statistical calculations on the inputted post-conversion frequency offset values and thereby calculates a statistical frequency offset (step S108). For example, the offset compensation unit 222 calculates the statistical frequency offset by calculating a mean value of the plural inputted post-conversion frequency offset values.

The offset compensation unit 222 gives the calculated statistical frequency offset to the transmission/reception unit 221, and thereby makes offset compensation (step S109). Specifically, by giving the statistical frequency offset to the transmission/reception unit 221, the offset compensation unit 222 changes the frequency band to a value receivable by the transmission/reception unit 221. That is, by giving the statistical frequency offset to the transmission/reception unit 221, the offset compensation unit 222 corrects the range of the frequency band receivable by the transmission/reception unit 221. The transmission/reception unit 221 receives a signal in the frequency band corrected by the offset compensation unit 222 (step S110).

In the wireless communication system 1 configured as described above, the offset compensation unit 222 compensates for the frequency offsets occurring during communications between the plural terminal stations 3 and the mobile relay station 2. Specifically, the offset compensation unit 222 gives a statistical frequency offset obtained from a statistic of plural frequency offsets occurring during communications between respective ones of the plural terminal stations 3 and the mobile relay station 2 to the transmission/reception unit 221. That is, before performing a reception process, the mobile relay station 2 preestimates Doppler frequency occurring during communications with each of the terminal stations 3 and compensates for the frequency offsets such that the offsets will be smoothed among all the terminal stations 3. Consequently, the mobile relay station 2 can reduce the Doppler frequency of the entire system. Furthermore, rather than compensating for the frequency offset of each terminal station 3 individually as with conventional techniques, the mobile relay station 2 takes statistics of frequency offset results obtained from the respective terminal stations 3 and determines a compensation range for the frequency offsets. Therefore, the wireless communication system 1 can reduce amounts of computation needed to compensate for the frequency offsets. This allows the wireless communication system 1 to reduce the impact of Doppler shift while suppressing amounts of computation.

Variation of First Embodiment

The mobile relay station 2 may be configured to receive terminal uplink signals via plural antennas and use MIMO (Multiple Input Multiple Output) to transmit base station downlink signals.

Figure 3:
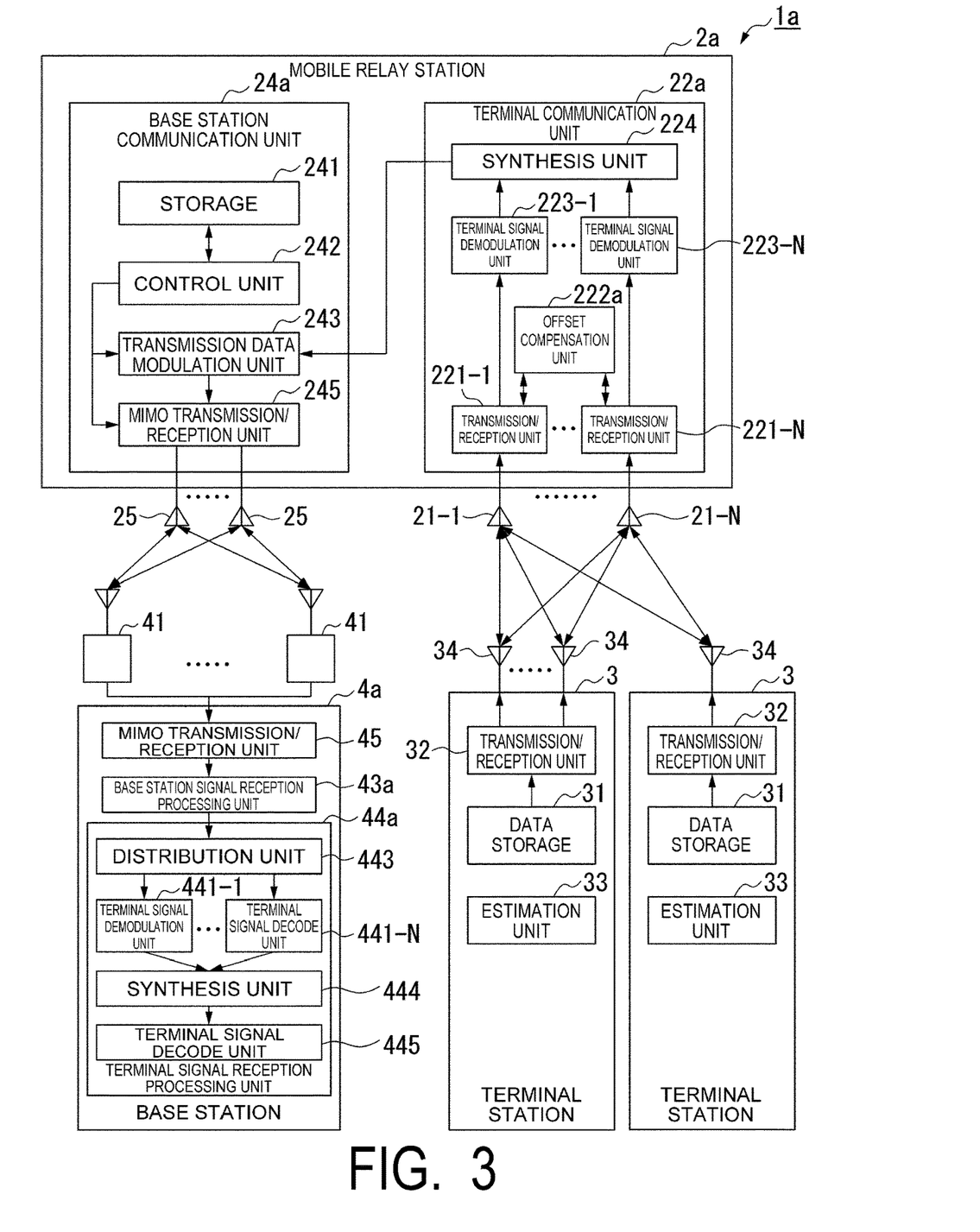
FIG. 3 is a configuration diagram of a wireless communication system according to a variation of the first embodiment.

FIG. 3 is a configuration diagram of a wireless communication system Ta according to a variation of the first embodiment. In FIG. 1, the same components as those of the wireless communication system 1 according to the first embodiment shown in FIG. 1 are denoted by the same reference signs as the corresponding components in FIG. 1, and description thereof will be omitted. The wireless communication system 1a includes a mobile relay station 2a, terminal stations 3, and a base station 4a.

The mobile relay station 2a includes N antennas 21 (N is an integer equal to or larger than 2), a terminal communication unit 22a, a base station communication unit 24a, and plural antennas 25. Individual ones of the N antennas 21 will be referred to as antennas 21-1 to 21-N.

The terminal communication unit 22a includes N transmission/reception units 221, an offset compensation unit 222a (first offset compensation unit), N terminal signal demodulation units 223, and a synthesis unit 224. The N transmission/reception units 221 will be referred to as transmission/reception units 221-1 to 221-N. The N terminal signal demodulation units 223 will be referred to as terminal signal demodulation units 223-1 to 223-N.

The transmission/reception unit 221-$n$ ($n$ is an integer not smaller than 1 but not larger than N) receives a terminal uplink signal via the antenna 21-$n$.

The offset compensation unit 222a compensates for the frequency offsets occurring during communications between the plural terminal stations 3 and the mobile relay station 2a. More specifically, the offset compensation unit 222a gives a statistical frequency offset obtained from a statistic of plural frequency offsets occurring during communications between respective ones of the plural terminal stations 3 and the mobile relay station 2a to the transmission/reception unit 221-$n$. A method for calculating the statistical frequency offset is similar to the method according to the first embodiment. A difference from the first embodiment is that the offset compensation unit 222a gives the statistical frequency offset to the transmission/reception unit 221-$n$.

The terminal signal demodulation unit 223-$n$ ($n$ is an integer not smaller than 1 but not larger than N) demodulates the terminal uplink signal received by the transmission/reception unit 221-$n$ and outputs demodulation results to the synthesis unit 224.

The synthesis unit 224 combines demodulation results received as input from the respective terminal signal demodulation units 223-1 to 223-N and outputs resulting demodulation information to the base station communication unit 24a.

The base station communication unit 24a relays terminal uplink signals to the base station 4a using MIMO. The base station communication unit 24a includes a storage 241, a control unit 242, a transmission data modulation unit 243, and a MIMO transmission/reception unit 245.

The storage 241 prestores weights for the base station downlink signals transmitted from the respective antennas 25, where the weights are classified by send time. The send time may be expressed, for example, by elapsed time with respect to the transmission start timing. The weights classified by send time are calculated based on orbital information about the LEO satellite and positions of the respective antennas 41. The orbital information about the LEO satellite provides information about the position, velocity, moving direction, and the like of the LEO satellite at any desired time. Note that a fixed weight may be used regardless of the send time.

The control unit 242 instructs the MIMO transmission/reception unit 245 to use the weights classified by send time and read out of the storage 241.

When demodulation information is outputted by the synthesis unit 224, the transmission data modulation unit 243 accepts input of the demodulation information as transmit data, converts the transmit data into parallel signals, and modulates the parallel signals.

The MIMO transmission/reception unit 245 assigns weights to the modulated parallel signals based on instructions from the control unit 242 and thereby generates base station downlink signals to be transmitted from the respective antennas 25. The MIMO transmission/reception unit 245 transmits the generated base station downlink signals from the respective antennas 25 using MIMO.

The base station 4a includes plural antennas 41, a MIMO transmission/reception unit 45, a base station signal reception processing unit 43a, and a terminal signal reception processing unit 44a.

The antennas 41 are placed at positions away from one another so as to increase an angle difference of arrival of the signals from the plural antennas 25 of the mobile relay station 2. The antennas 41 output the base station downlink signals received from the mobile relay station 2 to the MIMO transmission/reception unit 45 by converting the signals into electric signals.

The MIMO transmission/reception unit 45 puts together the base station downlink signals received via the plural antennas 41. Based on orbital information about the LEO satellite and positions of the respective antennas 41, the MIMO transmission/reception unit 45 stores weights for the base station downlink signals received by the respective antennas 41 by classifying the weights by receive time. The receive time may be expressed, for example, by elapsed time with respect to reception start timing. The MIMO transmission/reception unit 45 multiplies the base station downlink signals inputted through the respective antennas 41 by the weights corresponding to the receive times of the base station downlink signals and combines receive signals multiplied by the weights. Note that the same weight may be used regardless of the receive time.

The base station signal reception processing unit 43a demodulates and decodes the receive signals resulting from the combination and thereby obtains demodulation information. The base station signal reception processing unit 43a outputs the demodulation information to the terminal signal reception processing unit 44a.

The terminal signal reception processing unit 44a performs a reception process for the terminal uplink signals indicated by the receive waveform information. In so doing, the terminal signal reception processing unit 44a acquires terminal transmit data by performing a reception process based on the wireless communication scheme used for transmission by the terminal station 3. The terminal signal reception processing unit 44a includes N terminal signal demodulation units 441, a terminal signal decode unit 442, a distribution unit 443, and a synthesis unit 444. The N terminal signal demodulation units 441 will be referred to as terminal signal demodulation units 441-1 to 441-N.

The distribution unit 443 reads waveform data received at the same receive time out of the receive waveform information and outputs the read waveform data to the terminal signal demodulation units 441-1 to 441-N according to antenna identifiers associated with the waveform data. That is, the distribution unit 443 outputs the waveform data associated with the antenna identifier of the antenna 21-$n$ to the terminal signal demodulation unit 441-$n$.

The terminal signal demodulation units 441-1 to 441-N demodulate respective signals represented by waveform data, and output symbols obtained by the demodulation to the synthesis unit 444. The terminal signal demodulation unit 441-$n$ may perform demodulation after compensating the signal represented by the waveform data for the Doppler shift of the terminal uplink signal received by the antenna 21-$n$ of the mobile relay station 2. The Doppler shift that impacts the terminal uplink signal received by each antenna 21-$n$ is calculated in advance based on the position of the terminal station 3 and the orbital information about the LEO satellite carrying the mobile relay station 2b. The synthesis unit 444 additively synthesizes the symbols received as input from the terminal signal demodulation units 441-1 to 441-N, respectively, and outputs the result of additive synthesis to the terminal signal decode unit 442. The terminal signal decode unit 442 decodes the additively synthesized symbols and thereby obtains the terminal transmit data transmitted from the terminal station 3.

With the above configuration, even when MIMO communications are conducted between the mobile relay station 2a and the base station 4a, amounts of computation needed to compensate for frequency offsets can be reduced. This makes it possible to reduce the impact of Doppler shift while suppressing amounts of computation.

Second Embodiment

In a second embodiment, description will be given of a configuration in which a statistical frequency offset is calculated by a technique different from the first embodiment. More specifically, according to the second embodiment, a mobile relay station estimates Doppler frequency based on surrounding information such as position information about terminal stations and position information, altitude information, orbital information about the mobile relay station. Then, based on the estimated Doppler frequency, the mobile relay station changes a receivable frequency band.

Figure 4:
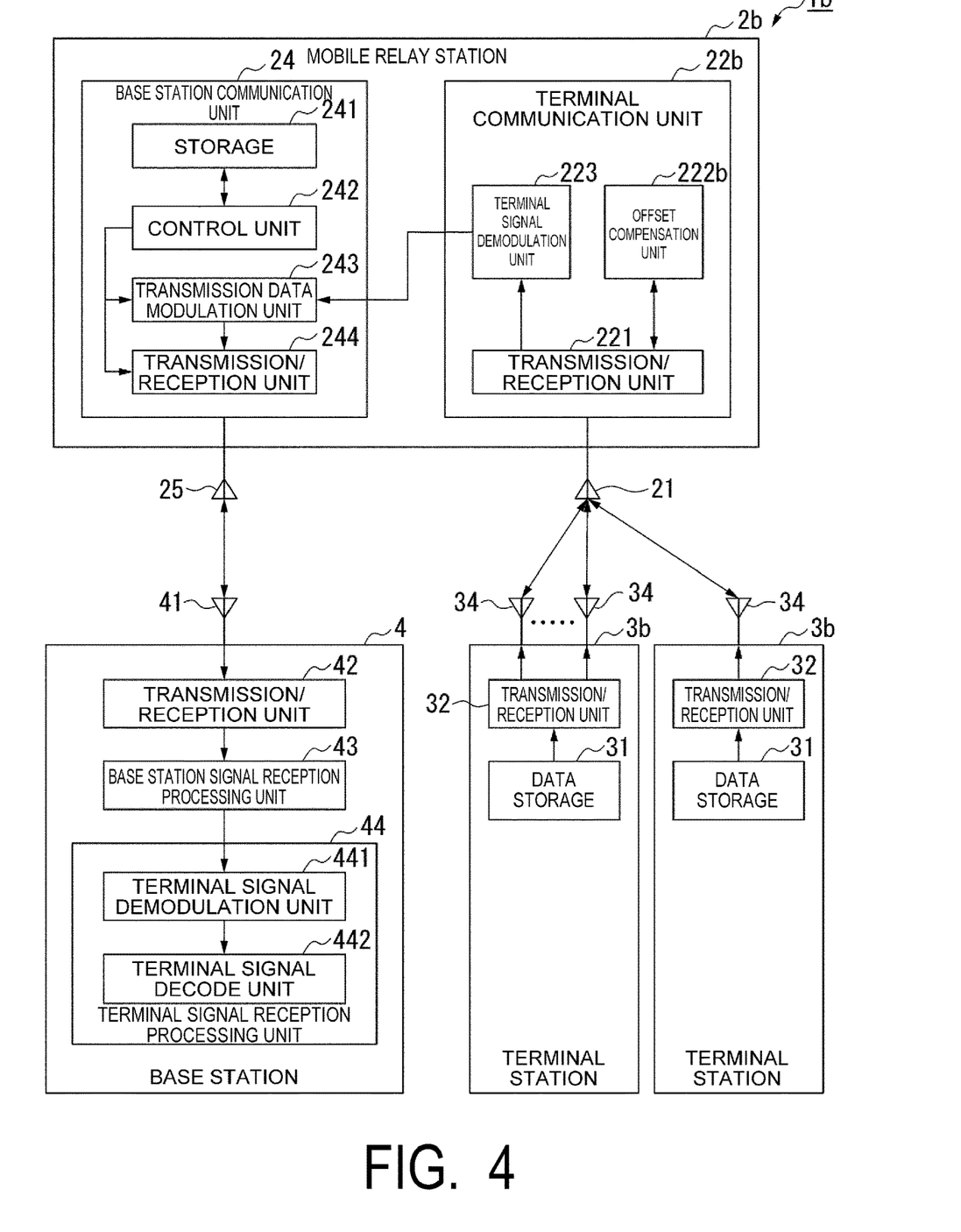
FIG. 4 is a configuration diagram of a wireless communication system according to a second embodiment.

FIG. 4 is a configuration diagram of a wireless communication system 1b according to the second embodiment. In FIG. 4, the same components as those of the wireless communication system 1 according to the first embodiment shown in FIG. 1 are denoted by the same reference signs as the corresponding components in FIG. 1, and description thereof will be omitted. The wireless communication system 1b includes a mobile relay station 2b, plural terminal stations 3b, and a base station 4. The numbers of mobile relay stations 2b, terminal stations 3b, and base stations 4 of the wireless communication system 1b are optional, but it is assumed that the number of terminal stations 3b is large.

The mobile relay station 2b includes an antenna 21, a terminal communication unit 22b, a base station communication unit 24, and an antenna 25.

The terminal communication unit 22b includes a transmission/reception unit 221, an offset compensation unit 222b (first offset compensation unit), and a terminal signal demodulation unit 223.

The offset compensation unit 222b compensates for the frequency offsets occurring during communications between the plural terminal stations 3 and the mobile relay station 2. More specifically, based on the altitude and orbit of the mobile relay station 2, the offset compensation unit 222b estimates the frequency offsets occurring during communications between the plural terminal stations 3 and the mobile relay station 2 and calculates a statistical frequency offset using the values of the plural estimated frequency offsets.

The terminal station 3b includes a data storage 31, a transmission/reception unit 32, and one or more antennas 34. The terminal station 3b differs in configuration from the terminal station 3 in that no estimation unit 33 is provided. Otherwise, the terminal station 3b is similar in configuration to the first embodiment.

In this way, unlike the first embodiment, the terminal station 3b according to the second embodiment does not estimate the frequency offsets occurring between the terminal stations 3b and the mobile relay station 2b.

Operation of the wireless communication system 1b will be described.

Figure 5:
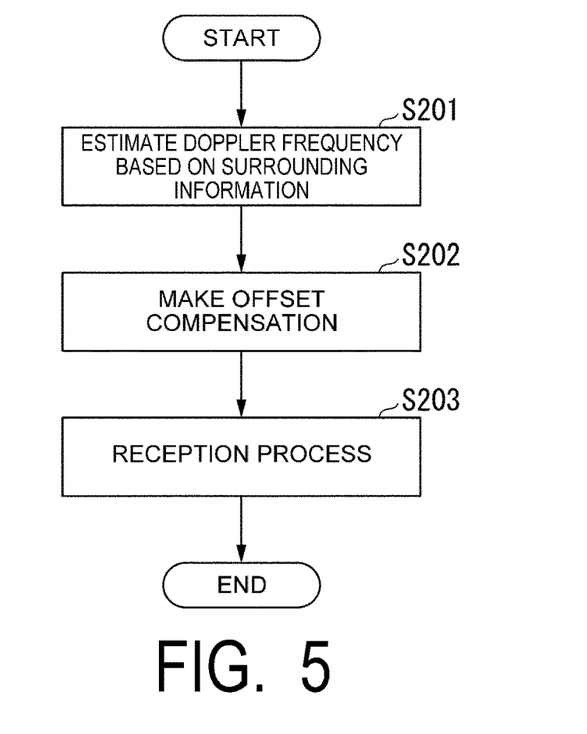
FIG. 5 is a flowchart showing a flow of a frequency offset process performed by a mobile relay station according to the second embodiment.

FIG. 5 is a flowchart showing a flow of a frequency offset process performed by the mobile relay station 2b according to the second embodiment. The process shown in FIG. 5 is performed either periodically or when a predetermined timing elapses.

Figure 6:
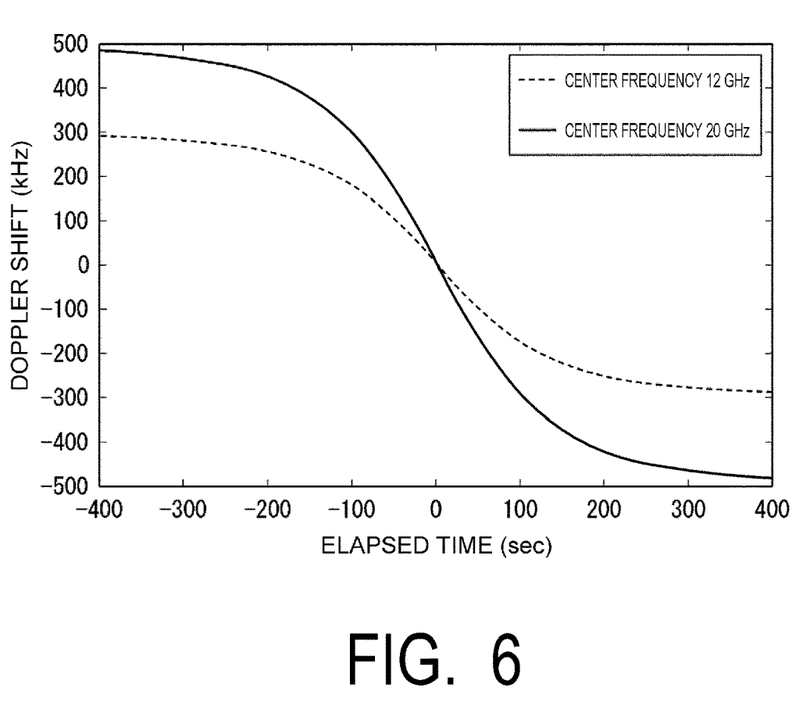
FIG. 6 is a diagram showing time variation of Doppler shift occurring according to altitude of the mobile relay station.

The offset compensation unit 222b estimates Doppler frequency based on surrounding information (step S201). Specifically, the offset compensation unit 222b holds information such as shown in FIG. 6 and estimates Doppler frequency based on surrounding information such as position information about the terminal stations 3b and position information, altitude information, and orbital information about the mobile relay station 2b. For example, the offset compensation unit 222b estimates the Doppler frequency of each terminal station 3b.

FIG. 6 is a diagram showing time variation of Doppler shift occurring according to altitude of the mobile relay station 2b. In FIG. 6, the abscissa represents elapsed time and the ordinate represents Doppler shift of an uplink signal. When the elapsed time is 0 sec., the mobile relay station 2b is located right above a specific terminal station 3b. In FIG. 6, it can be seen that when the mobile relay station 2b is located right above the specific terminal station 3b, no Doppler shift occurs.

The offset compensation unit 222b calculates a statistical frequency offset based on plural estimated Doppler frequencies. The offset compensation unit 222b gives the calculated statistical frequency offset to the transmission/reception unit 221, and thereby makes offset compensation (step S202). Specifically, by giving the statistical frequency offset to the transmission/reception unit 221, the offset compensation unit 222b corrects the range of the frequency band receivable by the transmission/reception unit 221. The transmission/reception unit 221 receives a signal in the frequency band corrected by the offset compensation unit 222b (step S203).

The wireless communication system 1b configured as described above can reduce amounts of computation needed to compensate for the frequency offsets by a method different from the first embodiment. Furthermore, as shown in FIG. 6, the time variation of the Doppler shift occurring according to the altitude of the mobile relay station 2b is fixed to some extent. The use of such information allows the amounts of computation to be reduced. This makes it possible to reduce the impact of Doppler shift while suppressing the amounts of computation.

Variation of Second Embodiment

As with the first embodiment, the wireless communication system 1b may be configured to receive terminal uplink signals via plural antennas and use MIMO to transmit base station downlink signals. When the wireless communication system 1b is configured in this way, it is sufficient to replace the configuration of the base station communication unit 24 of the mobile relay station 2b and the configuration of the base stations 4 with the configuration of the base station communication unit 24a and the configuration of the base station 4a, respectively, shown in FIG. 3.

Third Embodiment

In a third embodiment, description will be given of a configuration in which offset compensation is made by a terminal station. Specifically, Doppler frequency occurring between a mobile relay station and a terminal station is estimated by the terminal station. Then, the terminal station generates an uplink signal shifted by an amount equivalent to the estimated Doppler frequency and transmits the uplink signal to the mobile relay station 2.

Figure 7:
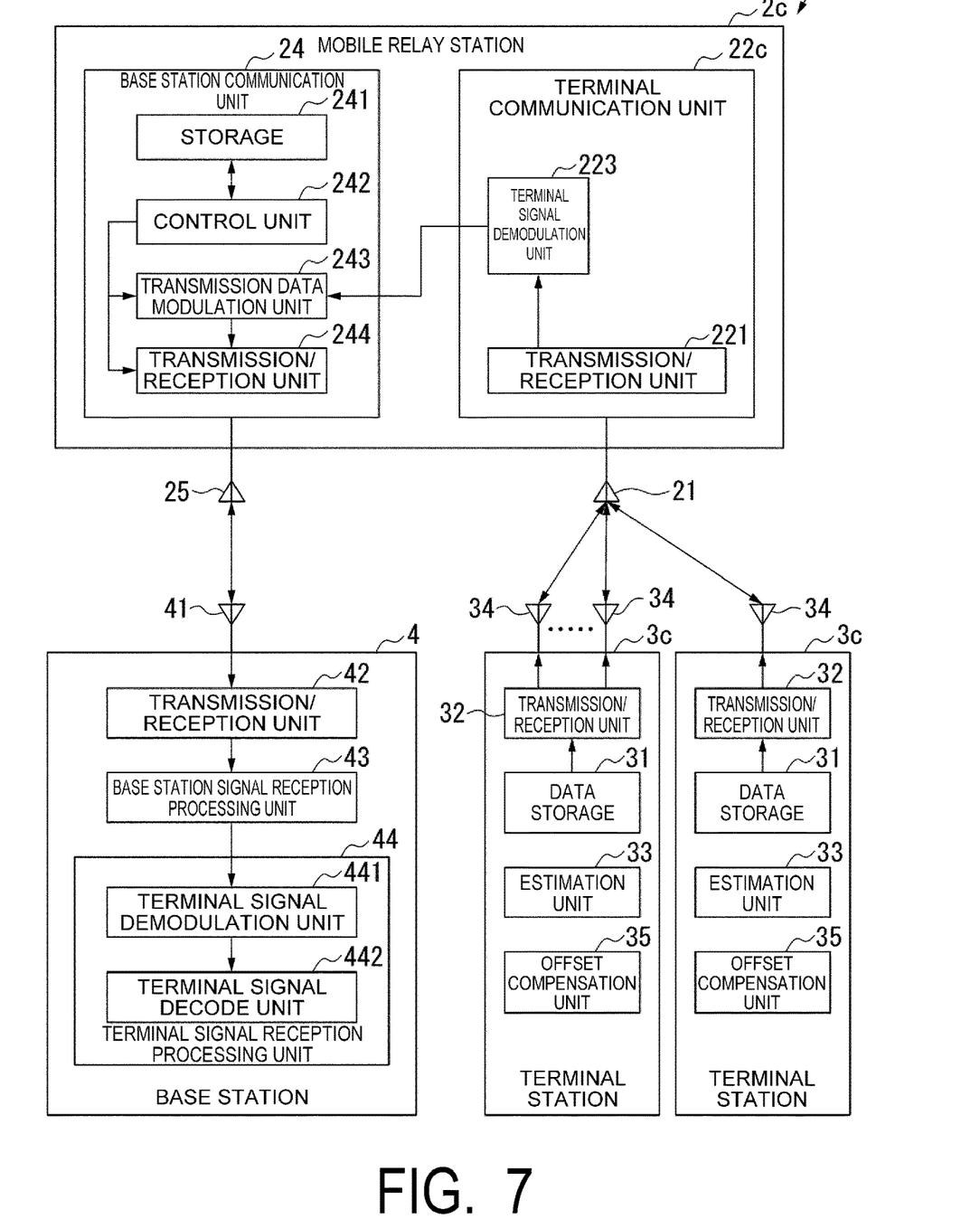
FIG. 7 is a configuration diagram of a wireless communication system according to a third embodiment.

FIG. 7 is a configuration diagram of a wireless communication system 1c according to the third embodiment. In FIG. 7, the same components as those of the wireless communication system 1 according to the first embodiment shown in FIG. 1 are denoted by the same reference signs as the corresponding components in FIG. 1, and description thereof will be omitted. The wireless communication system 1c includes a mobile relay station 2c, plural terminal stations 3c, and a base station 4. The numbers of mobile relay stations 2c, terminal stations 3c, and base stations 4 of the wireless communication system 1c are optional, but it is assumed that the number of terminal stations 3c is large.

The mobile relay station 2c includes an antenna 21, a terminal communication unit 22c, a base station communication unit 24, and an antenna 25.

The terminal communication unit 22c includes a transmission/reception unit 221 and a terminal signal demodulation unit 223. The mobile relay station 2c differs in configuration from the mobile relay station 2 in that no offset compensation unit 222 is provided. Otherwise, the terminal communication unit 22c is similar in configuration to the first embodiment.

In this way, unlike the first embodiment, the mobile relay station 2c according to the third embodiment does not give any frequency offset to the transmission/reception unit 221. That is, the mobile relay station 2c does not compensate for the frequency offsets unlike the mobile relay station 2.

The terminal station 3c includes a data storage 31, a transmission/reception unit 32 (transmitter), an estimation unit 33, one or more antennas 34, and an offset compensation unit 35.

The offset compensation unit 35 compensates for frequency offsets occurring during communications between the plural terminal stations 3c and the mobile relay station 2c. More specifically, the offset compensation unit 35 gives the frequency offsets occurring during communications between the terminal station 3c (local device) and the mobile relay station 2c to the transmission/reception unit 32.

Giving a frequency offset to the transmission/reception unit 32 means making a change so as to shift the frequency band available to the transmission/reception unit 32 for use in transmission by an amount equivalent to the frequency offset. If the frequency offset is "20 MHz," the uplink signal transmitted from the terminal station 3c will be received by the mobile relay station 2c with the frequency of the uplink signal being shifted by "20 MHz." Thus, when the frequency offset is "20 MHz," the offset compensation unit 35 changes the frequency of the uplink signal transmitted from the terminal station 3c such that the frequency will be shifted by "−20 MHz." Consequently, the impact of the offset can be reduced when the uplink signal is received by the mobile relay station 2c.

Operation of the wireless communication system 1c will be described.

Figure 8:
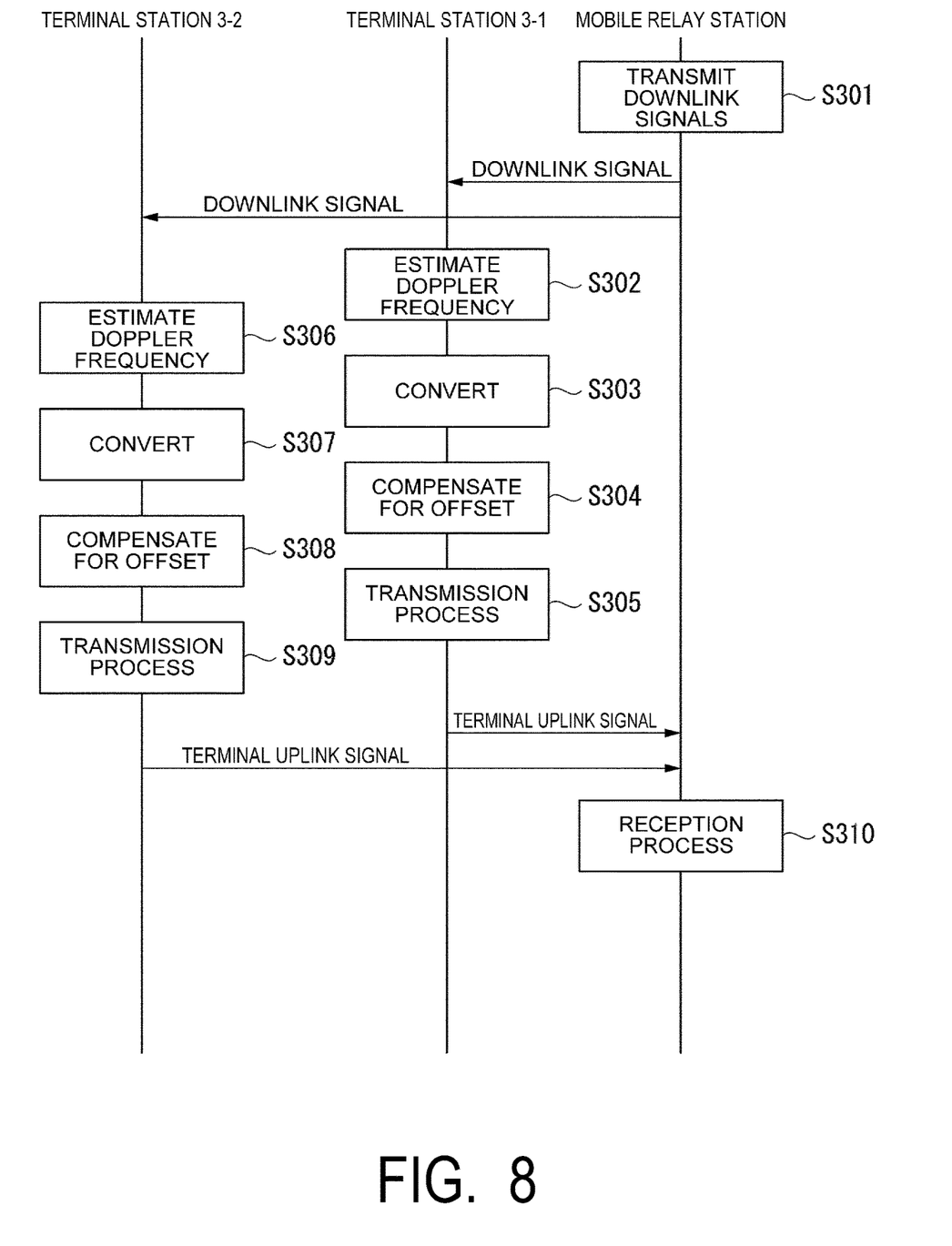
FIG. 8 is a sequence diagram showing a flow of a frequency offset process of the wireless communication system according to the third embodiment.

FIG. 8 is a sequence diagram showing a flow of a frequency offset process of the wireless communication system 1c according to the third embodiment. In FIG. 7, description will be given by taking as an example a case in which two terminal stations 3c (terminal station 3c-1 and terminal station 3c-2) are provided in the wireless communication system 1c. To distinguish functional parts of the two terminal stations 3c-1 and 3c-2 from each other, branch numbers "−1" and "−2" are assigned to the respective functional parts. The process shown in FIG. 8 is performed either periodically or when a predetermined timing elapses.

The mobile relay station 2c transmits downlink signals to the respective terminal stations 3c-1 and 3c-2 via the transmission/reception unit 221 (step S301).

The terminal stations 3c-1 and 3c-2 receive the downlink signals transmitted from the mobile relay station 2c via the antennas 34-1 and 34-2, respectively. The received downlink signals are inputted to the estimation units 33-1 and 33-2, respectively.

The estimation unit 33-1 of the terminal station 3c-1 estimates Doppler frequency based on the inputted downlink signal (step S302). The estimation unit 33-1 converts the estimated Doppler frequency into Doppler frequency experienced by uplink frequency (step S303). The estimation unit 33-1 outputs the frequency offset value resulting from the conversion to an offset compensation unit 35-1.

The offset compensation unit 35-1 of the terminal station 3c-1 gives the transmission/reception unit 32-1 the value of the frequency offset resulting from the conversion and thereby compensates for the offset (step S304). Specifically, the offset compensation unit 35-1 corrects the range of the frequency band to be used for transmission by the transmission/reception unit 32-1. The transmission/reception unit 32-1 of the terminal station 3c-1 transmits the terminal uplink signal to the mobile relay station 2c using the frequency band corrected by the offset compensation unit 35-1 (step S305).

The estimation unit 33-2 of the terminal station 3c-2 estimates Doppler frequency based on the inputted downlink signal (step S306). The estimation unit 33-2 converts the estimated Doppler frequency into Doppler frequency to be experienced by uplink frequency (step S307). The estimation unit 33-2 outputs the frequency offset value resulting from the conversion to an offset compensation unit 35-2.

The offset compensation unit 35-2 of the terminal station 3c-2 gives the transmission/reception unit 32-2 the value of the frequency offset resulting from the conversion and thereby compensates for the offset (step S308). Specifically, the offset compensation unit 35-2 corrects the range of the frequency band to be used for transmission by the transmission/reception unit 32-2. The transmission/reception unit 32-2 of the terminal station 3c-2 transmits the terminal uplink signal to the mobile relay station 2c using the frequency band corrected by the offset compensation unit 35-2 (step S309).

The mobile relay station 2c receives the terminal uplink signals transmitted from the terminal stations 3c-1 and 3c-2 via the antenna 21 (step S310).

The wireless communication system 1c configured as described above compensates for a frequency offset in each of the terminal stations 3c before conducting communications with the mobile relay station 2c. Specifically, when the Doppler frequency to be experienced by uplink frequency is known, the terminal station 3c compensates for the frequency offset by giving an error corresponding to the Doppler frequency to a signal during transmission. This makes it possible to reduce the impact of Doppler shift. Furthermore, with the wireless communication system 1c, since the computation needed to compensate for the frequency offsets are performed by the individual terminal stations 3c, there is no need for the mobile relay station 2c to perform computation needed to compensate for the frequency offsets. This makes it possible to suppress the amounts of computation. Thus, the impact of Doppler shift can be reduced while suppressing the amounts of computation.

Variation of Third Embodiment

As with the first embodiment, the wireless communication system 1c may be configured to receive terminal uplink signals via plural antennas and use MIMO to transmit base station downlink signals. When the wireless communication system 1c is configured in this way, it is sufficient to replace the configuration of the base station communication unit 24 of the mobile relay station 2c and the configuration of the base stations 4 with the configuration of the base station communication unit 24a and the configuration of the base station 4a, respectively, shown in FIG. 3.

The embodiments described above involves reducing the impact of Doppler shift occurring on the uplink from terminal stations to a mobile relay station. As described above, the impact of Doppler shift occurs on the downlink as well. Thus, each of the above embodiments may be configured to reduce Doppler shift occurring between the mobile relay station and the base station as well. This configuration will be described by taking as an example the first embodiment. As methods for reducing Doppler shift occurring between the mobile relay station and the base station, a first method and a second method are available.

According to the first method, the mobile relay station 2 or the base station 4 calculates frequency offsets based on orbital information about the mobile relay station 2.

According to the second method, the frequency offsets occurring between the mobile relay station 2 and the base station 4 are calculated by the base station 4 and fed back to the mobile relay station 2.

First, cases in which the first method is used will be described.
(When the Mobile Relay Station 2 Calculates Frequency Offsets Based on Orbital Information about the Mobile Relay Station 2)

In this configuration, the base station communication unit 24 of the mobile relay station 2 further includes an offset compensation unit (second offset compensation unit). The offset compensation unit of the base station communication unit 24 estimates the frequency offsets occurring during communications between the base station 4 and the mobile relay station 2 based on the altitude and orbit of the mobile relay station 2 and position information about the base station 4. A specific process is similar to that of the offset compensation unit 222b. The offset compensation unit of the base station communication unit 24 gives the values of the estimated frequency offsets to a transmission/reception unit 244 and thereby corrects the range of the frequency band available to the transmission/reception unit 244 for use in transmission.

If the frequency offset is "20 MHz," the downlink signal transmitted from the mobile relay station 2 will be received by the base station 4 with the frequency of the downlink signal being shifted by "20 MHz." Thus, the offset compensation unit of the base station communication unit 24 gives a frequency offset during transmission such that the frequency offset that will impact the downlink signal received by the base station 4 will be reduced. Consequently, the impact of the offset can be reduced when the downlink signal is received by the base station 4.
(When the Base Station 4 Calculates Frequency Offsets Based on Orbital Information about the Mobile Relay Station 2)

In this configuration, the base station communication unit 24 of the mobile relay station 2 further includes an offset compensation unit (second offset compensation unit) and the base station 4 further includes an estimation unit. The estimation unit estimates the frequency offsets occurring during communications between the base station 4 and the mobile relay station 2 based on the altitude and orbit of the mobile relay station 2 and position information about the base station 4. A specific process is similar to that of the offset compensation unit 222b. The base station 4 notifies the mobile relay station 2 of the values of the estimated frequency offsets. The offset compensation unit of the base station communication unit 24 gives the frequency offset values notified of by the base station 4 to the transmission/reception unit 244 and thereby corrects the range of the frequency band available to the transmission/reception unit 244 for use in transmission.

First, a case in which the second method is used will be described.

In this configuration, the base station communication unit 24 of the mobile relay station 2 further includes an offset compensation unit (second offset compensation unit) (second offset compensator) and the base station 4 further includes an estimation unit. The mobile relay station 2 transmits a known signal such as a beacon signal to the base station 4. The estimation unit of the base station 4 estimates Doppler frequency based on the received known signal. A specific process is similar to that of the estimation unit 33. Subsequently, estimation unit of the base station 4 notifies the mobile relay station 2 of the estimated Doppler frequency as a frequency offset value. The mobile relay station 2 receives the frequency offset value notified of. The offset compensation unit of the base station communication unit 24 gives the frequency offset value notified of by the base station 4 to the transmission/reception unit 244 and thereby corrects the range of the frequency band available to the transmission/reception unit 244 for use in transmission.

Although a case where a moving body on which the mobile relay station is mounted is a LEO satellite has been described in the above embodiments, it may be a geostationary satellite, a drone, a HAPS, or another aircraft flying over the sky.

The statistical calculations performed by the offset compensation unit 222 and the estimation process performed by the estimation unit 33 in the embodiments described above may be implemented by a computer. In that case, programs that implement these functions may be recorded on a computer-readable recording medium and read and executed by a computer system to implement the functions. It is assumed that the "computer system" referred to herein includes an OS and hardware such as peripheral devices. Also, the "computer-readable recording medium" refers to a portable medium such as a flexible disk, a magneto-optical disk, a ROM, or a CD-ROM, or a storage device such as a hard disk built into the computer system.

Furthermore, the "computer-readable recording medium" may include a recording medium such as a communications wire that dynamically holds a program for a short time when the program is transmitted through a network such as the Internet or a communications line such as a telephone line, and a recording medium such as a volatile memory that holds the program in the computer system for a set amount of time when the computer system is acting as a server or a client during the transmission. The above program may be designed to implement only part of the functions described above or implement the functions described above in conjunction with a program prestored in the computer system. Alternatively, the above functions may be implemented using a programmable logic device such as a FPGA (Field Programmable Gate Array).

Embodiments of the present invention have been described in detail above with reference to the accompanying drawings, but specific configurations of the present invention are not limited to the embodiments described above and include designs and the like without departing from the gist of the invention.

Industrial Applicability

The present invention is applicable to techniques for conducting communications with mobile bodies carrying mobile relay stations.

REFERENCE SIGNS LIST 1, 1a, 1b, 1c wireless communication system
2, 2a, 2b, 2c Mobile relay station
3, 3b, 3c Terminal station
4, 4a Base station
21-1 to 21-N Antenna
22, 22a, 22b, 22c Terminal communication unit
24, 24a Base station communication unit
25 Antenna
31 Data storage
32 Transmission/reception unit
33 Estimation unit
34 Antenna
35 Offset compensation unit
41 Antenna
42 Transmission/reception unit
43, 43a Base station signal reception processing unit
44, 44a Terminal signal reception processing unit
45 MIMO transmission/reception unit
221-1 to 221-N Reception unit
222, 222a, 222b Offset compensation unit
223-1 to 223-N, 441-1 to 441-N Terminal signal demodulation unit
224, 444 Synthesis unit
241 Storage
242 Control unit
243 Transmission data modulation unit
245 MIMO transmission/reception unit
443 Distribution unit

The invention claimed is:

1. A wireless communication system that includes a plurality of communication devices and a relay device, which is mobile, the wireless communication system comprising
a first offset compensator configured to compensate for frequency offsets occurring during communications between the plurality of communication devices and the relay device,
wherein when the first offset compensator is provided on the relay device, the first offset compensator gives a statistical frequency offset obtained from a statistic of a plurality of frequency offsets occurring during communications between respective ones of the plurality of communication devices and the relay device to a receiver configured to receive wireless signals transmitted from respective ones of the plurality of communication devices, and
when the first offset compensator is provided on each of the plurality of communication devices, the first offset compensator gives a frequency offset occurring during communications between the communication device provided with the first offset compensator and the relay device to a transmitter configured to transmit wireless signals to the relay device,
wherein when the first offset compensator is provided on the relay device,
the first offset compensator calculates a mean value of the plurality of frequency offsets occurring during communications between respective ones of the plurality of communication devices and the relay device, thereby acquires the statistical frequency offset, gives the acquired statistical frequency offset to the receiver, and thereby changes a frequency band receivable by the receiver,
the receiver receives signals in the frequency band changed by the first offset compensator, and
wherein based on an altitude and an orbit of a moving body provided with the relay device, the first offset compensator estimates a plurality of frequency offsets occurring during communications between respective ones of the plurality of communication devices and the relay device, and acquires the statistical frequency offset using values of the estimated plurality of frequency offsets.

2. The wireless communication system according to claim 1, further comprising a base station device, wherein
the relay device further includes a second offset compensator configured to compensate for frequency offsets occurring during communications between the base station device and the relay device.

3. A relay device in a wireless communication system that includes a plurality of communication devices and the relay device, which is mobile, the relay device comprising:
a receiver configured to receive wireless signals transmitted from respective ones of the plurality of communication devices; and
a first offset compensator configured to compensate for frequency offsets occurring during communications between the plurality of communication devices and the relay device, wherein
the first offset compensator configured gives a statistical frequency offset obtained from a statistic of a plurality of frequency offsets occurring during communications between respective ones of the plurality of communication devices and the relay device to the receiver,
wherein when the first offset compensator is provided on the relay device,
the first offset compensator calculates a mean value of the plurality of frequency offsets occurring during communications between respective ones of the plurality of communication devices and the relay device, thereby acquires the statistical frequency offset, gives the acquired statistical frequency offset to the receiver, and thereby changes a frequency band receivable by the receiver,
the receiver receives signals in the frequency band changed by the first offset compensator, and
wherein based on an altitude and an orbit of a moving body provided with the relay device, the first offset compensator estimates a plurality of frequency offsets occurring during communications between respective ones of the plurality of communication devices and the relay device, and acquires the statistical frequency offset using values of the estimated plurality of frequency offsets.

4. A wireless communication method for a wireless communication system that includes a plurality of communication devices and a relay device, which is mobile, the wireless communication method comprising
an offset compensation step whereby the plurality of communication devices or the relay device compensates for frequency offsets occurring during communications between the plurality of communication devices and the relay device, wherein when the relay device has the offset compensation step, the offset compensation step gives a statistical frequency offset obtained from a statistic of a plurality of frequency offsets occurring during communications between respective ones of the plurality of communication devices and the relay device to a receiver configured to receive wireless signals transmitted from respective ones of the plurality of communication devices, and when each of the plurality of communication devices has the offset compensation step, the offset compensation step gives frequency offsets occurring during communications between the communication devices having the offset compensation step and the relay device to a transmitter configured to transmit wireless signals to the relay device, wherein when the offset compensation step is performed by the relay device, calculating a mean value of the plurality of frequency offsets occurring during communications between respective ones of the plurality of communication devices and the relay device, thereby acquires the statistical frequency offset, giving the acquired statistical frequency offset to the receiver, thereby changes a frequency band receivable by the receiver, receiving signals in the frequency band changed by the first offset compensator, wherein based on an altitude and an orbit of a moving body provided with the relay device, estimating a plurality of frequency offsets occurring during communications between respective ones of the plurality of communication devices and the relay device, and acquiring the statistical frequency offset using values of the estimated plurality of frequency offsets.

* * * * *